April 15, 1930. P. P. HORNI Re. 17,642

TRAFFIC SIGNAL

Original Filed Dec. 9, 1926 3 Sheets-Sheet 1

WITNESS

Oliver W. Holmes

Inventor

Paul P. Horni

By his Attorneys

Knight Bros

April 15, 1930. P. P. HORNI Re. 17,642

TRAFFIC SIGNAL

Original Filed Dec. 9, 1926 3 Sheets-Sheet 2

Inventor
Paul P. Horni
By his Attorneys
Knight Bros.

April 15, 1930. P. P. HORNI Re. 17,642

TRAFFIC SIGNAL

Original Filed Dec. 9, 1926 3 Sheets-Sheet 3

Inventor
Paul P. Horni
By his Attorneys
Knight Bros

Reissued Apr. 15, 1930 Re. 17,642

UNITED STATES PATENT OFFICE

PAUL P. HORNI, OF NEWARK, NEW JERSEY

TRAFFIC SIGNAL

Original No. 1,728,762, dated September 17, 1929, Serial No. 153,618, filed December 9, 1926. Application for reissue filed November 12, 1929. Serial No. 406,691.

My invention relates to signal lanterns designed to control vehicular traffic on highways.

A preferred form of traffic signal lanterns, in general use today, comprises two or more lantern units arranged in a vertical column, each lantern unit having a central lamp around which on the four sides of the lantern are placed colored lenses, the lamp occupying the common focus of all the four lenses of its unit. Each unit is therefore adapted to project light signals in four cardinal directions. Two opposite lenses of one unit may, for example, be colored red while the two collateral lenses may be colored green, thus enabling the one lamp to give simultaneously both the "go" signal for one straight-ahead direction and the "stop" signal for the cross traffic. Another unit vertically disposed with reference to the first unit will have the colors of the lenses shifted 90° from those of the first unit and generally a third unit will also be provided that has amber lenses on all four sides of the lantern for giving a clearance interval between changes of traffic. Such lanterns, while possessing the merit of simplicity and cheapness, have been found to fail in practice to meet conditions that are irregular or that require particular accuracy in the focusing of the signal rays. For example, when the lantern is hung at considerable elevation above the road, the light rays issuing therefrom may not strike the road at all, or they may strike it on a side where the roadway is up-grade and miss it altogether on a side where the roadway is down-grade. Similarly when the roadways meet at angles other than 90°, or in the event of the required independent signal control of two or more contiguous lanes of traffic which are substantially or nearly parallel, the rays issuing from the lenses may miss entirely one or more of the roads or lanes of traffic.

The object of the present invention is to provide means for adapting traffic controlling signal lanterns to these varying conditions which are encountered especially in crowded metropolitan districts.

To this end, the present invention in traffic signals comprises a lantern support and a group of a plurality of signal lanterns arranged around said support in a common horizontal plane, some, and preferably all, of the lanterns of said group being mounted upon and relatively adjustable about vertical axes upon said support to project the signal light rays of any two adjacent lanterns in any required angular relation between parallelism in two opposite directions. It is even possible, with the improved traffic signal to relatively adjust three of the lanterns upon the support to project the light rays of the three lanterns directions suitable for a plurality of contiguous substantially parallel traffic lanes.

In addition to the described relative adjustment of the signal lanterns in a horizontal plane, I prefer to provide a further adjustment of the individual lanterns in vertical planes upon horizontal axes to suit the grades of the roadways under the signal control.

In its preferred embodiment, the invention comprises a group of a plurality of vertical lantern housings arranged about a common center, each housing containing in a vertical tier all the lamps and their focusing lenses that comprise the signals for one direction and each of the said housings being independently adjustable on a fixed support both around a vertical axis for horizontal adjustment and around a horizontal axis for vertical adjustment so that all the lamps and their focusing lenses having been factory-assembled in any one housing to issue parallel rays may after the lanterns are located, have the lenses so presented that the associated rays will issue from any housing, in such a manner as a group to compensate for any irregularity.

The invention further comprises certain novel specific combinations embodied in the particular application of the invention as hereinafter described and claimed.

An embodiment of the invention is illustrated in the accompanying drawings, in which Figure 1 is a vertical section of a signal lantern;

Figure 5:
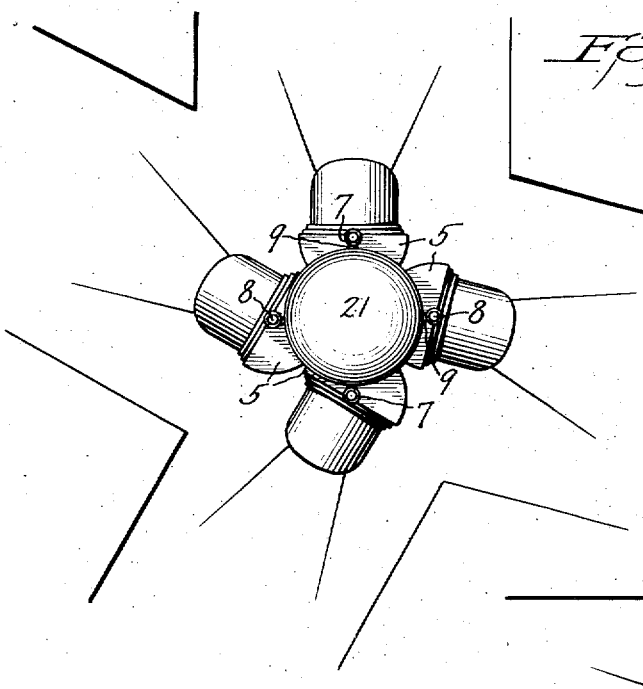
Figures 5, 6 and 7 are plan views showing how the lantern may be applied to road crossings having different angularities.
Figure 7:
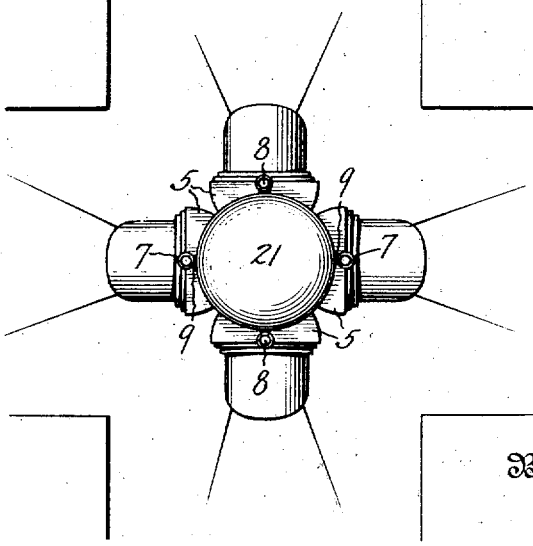
Figure 8:
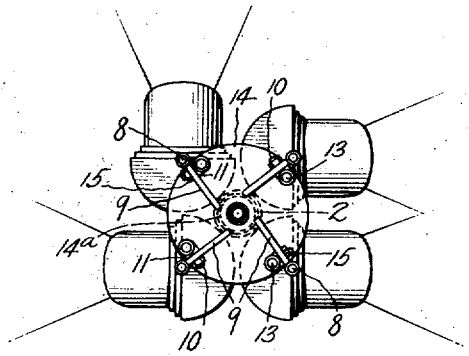

Figure 8 is a top plan view of the 4-unit traffic signal shown in Figures 5 and 7 with lamp 20, globe 21, and the standard therefor removed, the parallel presentation of two of the units in the same direction being arranged for the control of traffic along two adjacent lanes on the same street or boulevard.

Figure 6:
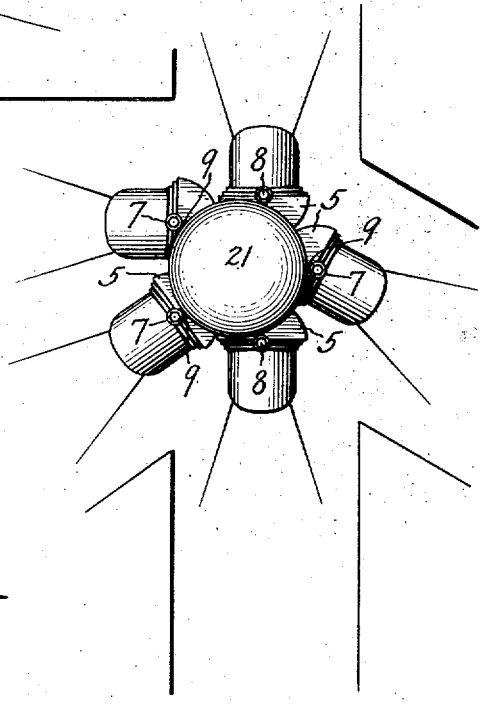
Figure 9:
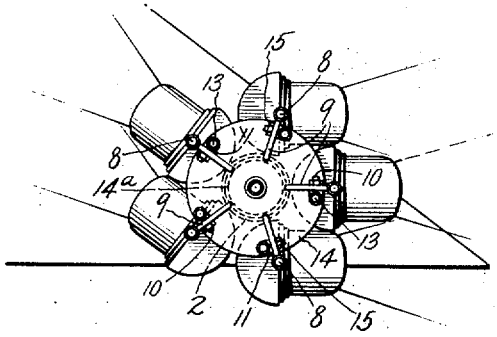

Figure 9 is a top plan view of the 5-unit traffic signal shown in Figure 6 with lamp 20, globe 21 and standard therefor removed, three of the units being arranged in parallelism and presented in the same direction for the control of traffic in three adjacent lanes on the same street or boulevard.

In the drawings, 1 represents a hollow pedestal or post for supporting the group of signal lanterns. On the top of this pedestal is mounted a lantern support 2 which is preferably made hollow in the form shown. The lower end of the tubular lantern support 2 is outwardly flanged as shown at $2^a$ to rest firmly upon a heavy flanged tubular thimble $1^a$ which is secured to the top of the pedestal 1. The thimble $1^a$ telescopes with the lower end of lantern support 2. At the base of the lantern support 2, an inverted bell 3 rests upon the horizontal flange of thimble $1^a$ and extends outwardly from the support and at suitable points has hollow trunnions or pivots 4 for forming the pivotal supports for the lamp housings which are shown at 5.

Lamp housings 5 have at their upper ends the upwardly presented rigid lugs 6 which are pivotally journalled in sleeves 7 being held therein by cap screws 8. The sleeves 7 have the slotted arms 9 through the slot of each of which passes the stem of a bolt 10 which extends laterally from a swivel block 11 which in turn is journalled on a vertical lug 12, the swivel block being held on the lug by a cap screw 13. The lugs 12 project upwardly from radial arms of a top plate 14 formed with a central downwardly presented annular flange or sleeve $14^a$ which telescopes in and is firmly secured to the upper end of the tubular lantern support 2. The clamping screw 10 has a nut 15.

The parts just described form a means of pivoting the upper end of each of the housings 5 on a vertical axis corresponding to the axis of the pivot 4 and also permitting a certain amount of tipping adjustment around a horizontal axis, the pivot 4 thus acting as a universal joint. By loosening the nut 15, the housing 5 can be tipped outwardly, rocking on the lower pivot 4 until the rays from lamps 16 in the housing passing through lenses 17 in the front of the housing will be concentrated on that part of the roadway where the most direct application of the light is desired. When so adjusted, the nut 15 can be tightened onto the slotted arm 9 to hold the lantern housing 5 permanently in the position of desired inclination. Similarly, by loosening a cap screw 8 each lantern housing can be turned as on a vertical or substantially vertical axis until the rays from the lights have the proper horizontal direction when the cap screw 8 upon being tightened clamps the sleeve 7 to lug 6 so as to hold the lantern housing permanently in the desired horizontal deflection. At the base of each lantern housing 5, a hollow trunnion 18 is made to match over the trunnion 4 so as to provide the universal joint necessary for the motions above described and through this hollow trunnion are led the wires 19 that supply electricity to the lamps 16. From this it will be seen that any adjustments of the lantern housings 5 will not interfere with the wiring. The means just described for pivoting the lanterns may be varied in numerous ways. Any well known means for adjusting a frame about a vertical or a horizontal axis may be employed.

Figure 1:
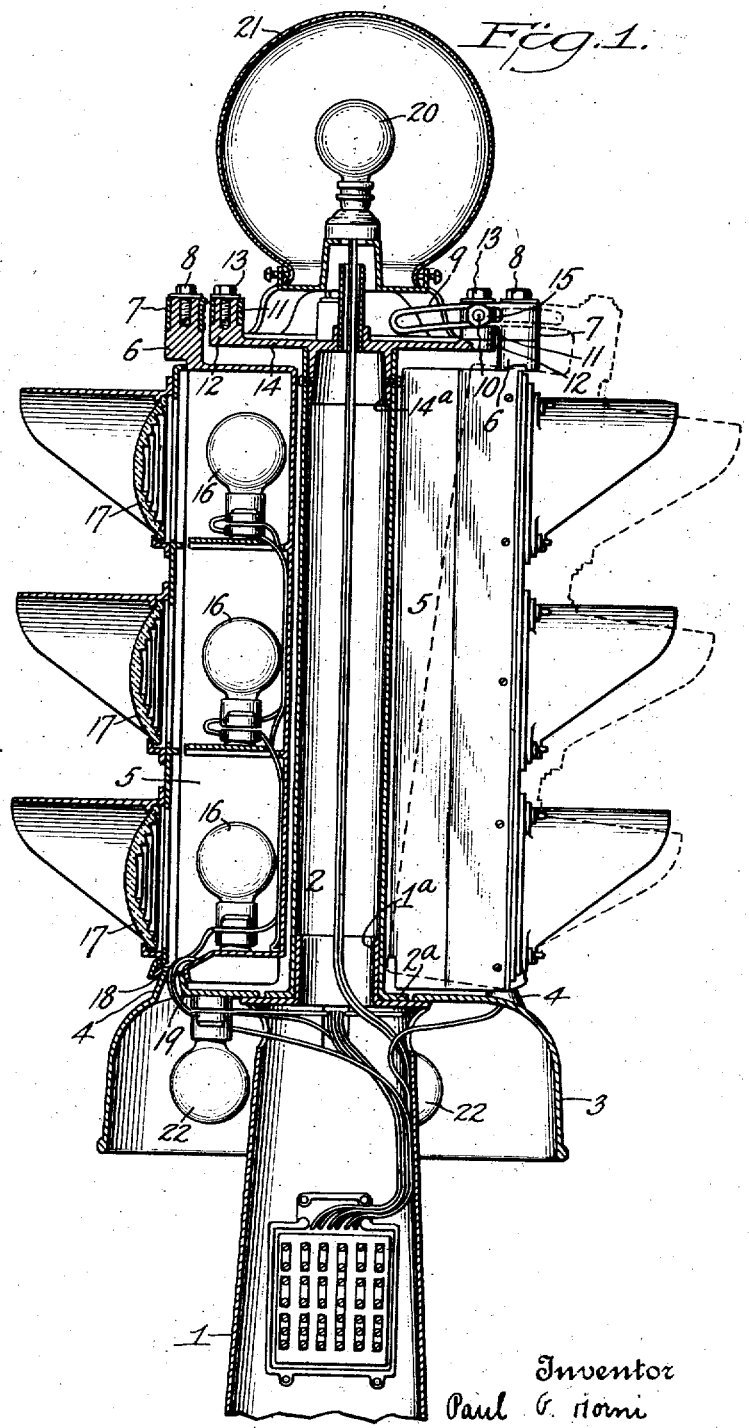
Figure 2:
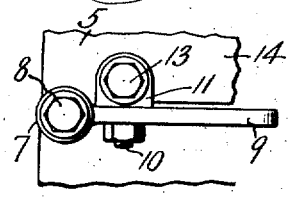
Figure 2 is a plan of one of the lantern adjusting devices.
Figure 3:
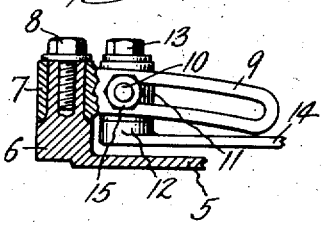
Figure 3 is an elevation of the same, details being in partial section.
Figure 4:
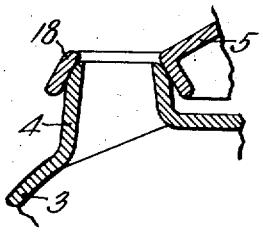
Figure 4 is a sectional view on an enlarged scale of the lower hollow pivot of a lantern.

The lamp 22 in the inverted bell 3 may be used to throw spill light onto the roadway or the base of the lamp supporting pedestal. A lamp 20 is also mounted at the top of the lantern and enclosed in a globe 21, these elements serving the purpose of an ordinary street lamp. The manner in which the lantern housings can be adjusted to cast the rays of the lamps downward is illustrated at the right hand side of Figure 1 by dotted lines, while in Figures 5, 6 and 7 are shown some of the various positions that the lantern housings may be adjusted to, around their vertical axes, to direct their rays along roadways having different angularities. In Figure 6 is illustrated a modification where five lantern housings are mounted on one support to be used where five roadways meet. It will be understood that the number of housings at any cross-road location will be varied to suit the requirements.

The expanse of the group of lantern housings around the lantern support will depend largely upon the number of lanterns in the group. The individual lantern housings are independently and relatively adjustable upon their substantially vertical supporting axes through suitable arcs of movement to enable the signal light rays of any two adjacent lanterns to be projected in any required angular relation between parallellism in two opposite directions. With the modified arrangement shown in Figure 6 of the drawings it is possible to adjust three of the lanterns in a horizontal plane to project the light rays of all three in suitable directions for a plurality of contiguous substantially parallel traffic lanes.

While I have described a particular embodiment of the invention, I do not wish to be limited to the various mechanical details as described as many other mechanical devices known to the art may be substituted for those shown and still come within the scope of my claims.

I claim:—

1. A traffic signal comprising a lantern support, a group of a plurality of signal lanterns spaced around said support in a common horizontal plane, all of the lanterns of said group being mounted upon independent vertical axes upon said support and adjustable relatively upon said axes to project the light rays of any two adjacent lanterns in any desired angular relation to each other between parallelism in the same or opposite directions.

2. A traffic signal comprising a lantern support, a group of a plurality of signal lanterns arranged around said support in a common horizontal plane, each of the lanterns of said group being mounted upon a vertical axis upon said support and adjustable about its said axis, and any two adjacent lanterns of said group being movable relatively thereto to project their signal light rays in parallelism with the signal light rays therefrom.

3. A traffic signal comprising a lantern support, a group of a plurality of signal lanterns spaced around said support in a common horizontal plane, each of said lanterns being mounted upon a vertical axis upon said support and adjustable through an arc upon its said axis to project the light rays of three of said signal lanterns towards the approaching traffic in a plurality of substantially parallel contiguous traffic lanes.

4. A traffic signal comprising a lantern support, a plurality of signal lanterns arranged around said support in a common horizontal plane, each of said lanterns being mounted upon a vertical axis upon said support and adjustable independently of the other lanterns, each pair of adjacent lanterns being relatively adjustable through an arc of approximately 180°, whereby the light rays of two or three of said signal lanterns can be projected in directions parallel to a plurality of contiguous substantially parallel traffic lanes.

5. A traffic signal comprising a lantern support, a plurality of signal lantern housings arranged around said support in spaced relation and in substantially the same horizontal plane, each of said lantern housings containing all the lamps and lenses for the signals of a particular direction arranged in the housing in a vertical column, and each of said housings being mounted upon a vertical axis upon said support and independently adjustable about its said axis in relation to adjacent lantern housings, whereby any two adjacent lantern housings may be adjusted to project their signal light rays towards approaching traffic in a plurality of contiguous substantially parallel traffic lanes.

6. A traffic signal comprising in combination, a lantern support, a plurality of lantern housings arranged around said support, each housing containing all the lamps and lenses for the signals of a particular direction arranged therein in a vertical column, each housing being mounted at its lower end on a universal pivotal connection with the support and at its upper end having means for adjusting and holding the housing at different vertical and horizontal angles, the universal pivot being hollow to permit the passage of wires.

7. A traffic signal comprising a plurality of signal lanterns, a lantern support common to all of said lanterns, said lanterns being arranged in a group around said common support and upon different axes substantially normal to a common plane, all of the lanterns of said group being independently adjustable about their respective axes to positions in which the light rays of any two adjacent lanterns are projected in variable angular relations or in parallelism.

8. A traffic signal comprising a lantern support, a plurality of signal lanterns arranged in a group around said lantern support, said lanterns being independently adjustable about their respective axes to relative positions in which the light rays of any two adjacent lanterns may be projected at relative angles of any degree between parallelism in the same direction and parallelism in opposite directions.

PAUL P. HORNI.